June 17, 1958  J. M. MITCHELL  2,839,111
ROTARY COCONUT FILLING DEVICE
Filed Feb. 16, 1956  3 Sheets-Sheet 1

INVENTOR
James M. Mitchell
BY
Cameron, Kerkam & Sutton
ATTORNEYS

June 17, 1958  J. M. MITCHELL  2,839,111
ROTARY COCONUT FILLING DEVICE
Filed Feb. 16, 1956  3 Sheets-Sheet 3

INVENTOR
James M. Mitchell
BY
Cameron, Kerkam & Sutton
ATTORNEYS

United States Patent Office 2,839,111
Patented June 17, 1958

2,839,111
ROTARY COCONUT FILLING DEVICE

James M. Mitchell, Hackensack, N. J., assignor to General Foods Corporation, New York, N. Y., a corporation of Delaware Application February 16, 1956, Serial No. 565,911

12 Claims. (Cl. 146—1)

This invention relates to rotary coconut filling devices and more particularly to such devices in which grated coconut is fed in a uniform and even flow to weighing and packaging machines to provide a closer control of the weight of coconut in each package.

Heretofore various devices have been proposed for feeding grated coconut to weighing and packaging machines in an effort to obtain an even and uniform flow of the grated coconut to provide close control of the weight of the coconut in each package. Such prior art devices include a drum rotatable on a horizontal axis and provided with teeth on the outer surface of the drum, the drum being arranged beneath the pipe or tube conveying the grated coconut to the weighing and packaging machines. Rotation of the drum brought the teeth into engagement with the mass of grated coconut in the pipe and was intended to prevent clogging in the pipe as well as to break up lumps or knots of the grated coconut to provide an even and uniform flow of the grated coconut from the drum to the weighing device. This drum structure did not always function as intended and frequently permitted the grated coconut to clog the pipe and often passed lumps or knots of the grated coconut to the weighing device. Close control of the weight of coconut dispensed from the weighing device to the packaging machine was therefore impossible with this structure.

In the present invention the disadvantages of the prior art structures are overcome and additional advantages are obtained, as will appear more fully hereinafter, by rotating about a vertical axis at the mouth of the coconut feeding pipe or tube, a wire basket which is designed according to the cut of the grated coconut. The grated coconut falls into this basket from the feed pipe or tube and passes outwardly through the basket by centrifugal force. All lumps or knots of the grated coconut are broken up and the coconut is fed from the rotary head virtually as individual shreds of coconut to the weighing device. An even and unform flow of grated coconut to the weighing device is thus provided which insures accurate and close weight control and clogging of the feed pipe is prevented.

It is accordingly an object of the present invention to provide a novel rotary coconut filling device which provides an even and uniform flow of grated coconut to the weighing and packaging machines.

Another object is to provide such a device which prevents clogging in the feed pipe.

Another object is to provide such a device which breaks up all lumps and knots of the grated coconut and delivers the grated coconut substantially as individual pieces of coconut to the weighing and packaging machines.

Another object is to provide such a device which can be used with various commercial cuts of grated coconut.

Another object is to provide such a machine which may be readily adapted for feeding the various cuts of grated coconut by changing the rotary head thereof.

Another object of the present invention is to provide novel rotary heads for such devices for use with the various cuts of grated coconut.

Other and further objects of the present invention will appear from the following description of an illustrative embodiment thereof.

This illustrative embodiment of the present invention should in no way be construed as defining or limiting the same and reference should be had to the appended claims to determine the scope of this invention.

Grated coconut is usually packaged with a moisture content of from 10 to 10½% and it is therefore essential that the grated coconut be prevented from forming lumps or knots and that the same be passed to the weighing mechanism in an even and uniform stream. Coconut is usually grated into commercial cuts known to the trade as "Fancy," "Standard" and "Macaroon." The Fancy and Standard cuts are coarse shreds of coconut approximating one-half inch in length while Macaroon is almost a coarse powder. Because of the different size of cuts different arrangements for the rotary head are required to break up the lumps or knots in each type of cut and to provide a constant and uniform flow to the weighing device, as will appear more fully hereinafter.

Referring now to the drawings, in which like reference characters indicate like parts, Fig. 1 is a perspective view of an illustrative embodiment of the present invention with the weighing and packaging machinery shown somewhat schematically therein, some parts being shown broken away and in section;

Figure 1:
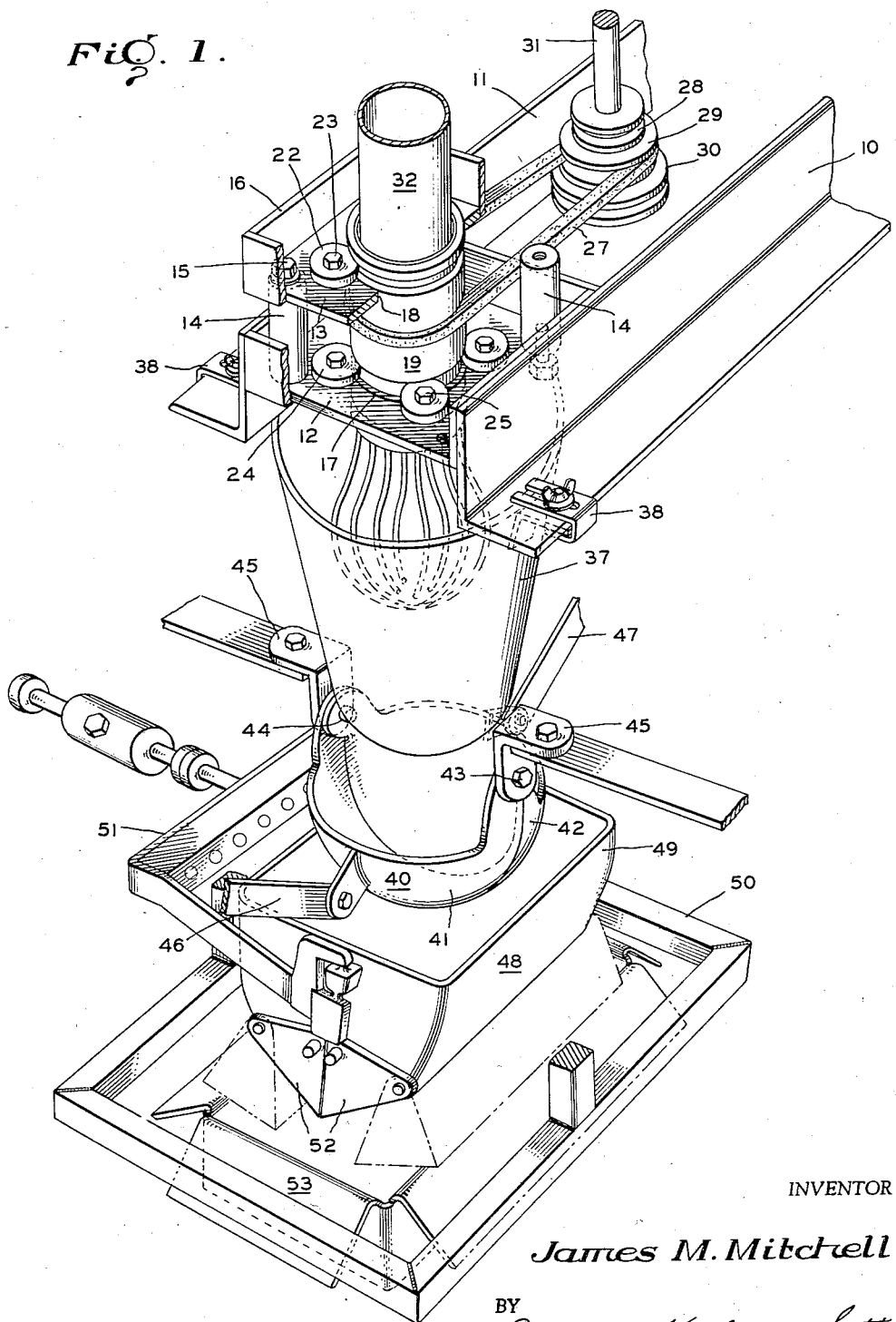
Figure 2:
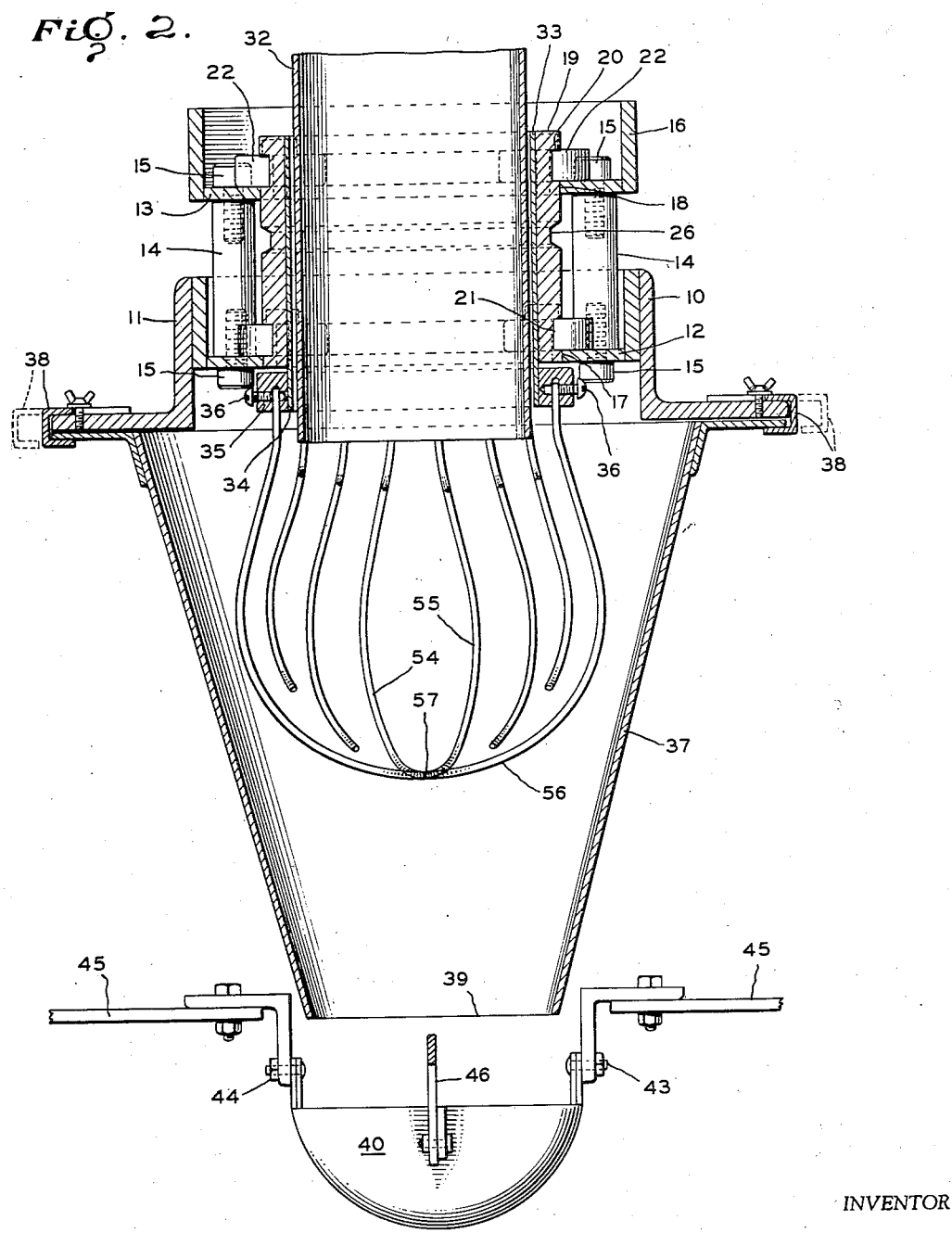
Fig. 2 is an enlarged view, partially in section on the vertical center line of the apparatus, showing a part of the embodiment of Fig. 1.

Referring now more particularly to Figs. 1 and 2, the embodiment of the rotary coconut filling device there illustrated is mounted between parallel channel members 10 and 11 and includes a lower horizontal plate 12 and upper horizontal plate 13. Plates 12 and 13 are suitably spaced by spacers 14 and are secured thereto by bolts 15. Plate 12 is circularly cut away at 17 and plate 13 is correspondingly cut away at 18.

A hollow cylindrical driving pulley 19 is mounted in openings 17 and 18 for rotation therein. Pulley 19 is provided with an upper bearing race 20 and a lower bearing race 21. Circular bearing members 22 are mounted in race 20 and rotate about their centers on bolts 23 which are mounted in plate 13. Similar circular bearing members 24 are mounted in bearing race 21 and rotate about their centers on bolts 25 which are mounted in plate 12. Pulley 19 is thus centered in openings 17 and 18 and is prevented from vertical movement.

Pulley 19 is provided with an annular groove 26 to receive a suitable drive belt 27. Drive belt 27 is driven by pulleys 28, 29 or 30 depending upon the speed of rotation desired for pulley 19 and pulleys 28, 29 and 30 are, in turn, rotated by shaft 31. A pipe or tube 32 extends from the coconut grating machine or from a source of supply of the grated coconut and extends downwardly through pulley 19. A sleeve 33 is secured in pulley 19 and extends downwardly therefrom to provide a lower annular surface 34. A ring base 35 is secured to surface 34 by set screws 36. Ring base 35 supports the rotary filling head which will be described in more detail with respect to Figs. 3 and 4.

A funnel shaped hopper 37 surrounds the rotary filling head and is suitably secured to channels 10 and 11 as by removable clips 38. Hopper 37 is provided with a mouth 39 which opens into any suitable cut-off gate generally indicated at 40. Gate 40 is seen to comprise a cooperating pair of semi-hemispherical members 41 and 42 which have common pivots 43 and 44, pivots 43 and 44 being carried in a suitable framework 45. Cut-off members 41 and 42 are suitably actuated by operating arms 46 and 47, respectively, it being understood that the cut-off gate so formed may be either manually or automatically actuated in cooperation with the weighing and packaging machines, as is well known to the art.

Suitable weighing mechanism is shown schematically at 48 and includes a weigh bucket 49 suitably mounted in a frame 50 and controlled by weight arm 51 to dispense through automatically actuated bottom doors 52 measured quantities of coconut to the package generally shown at 53. As noted above, the cut-off gate, the weighing mechanism, and the packaging mechanism are all devices well known to the art and may take any suitable and desirable form.

Figure 3:
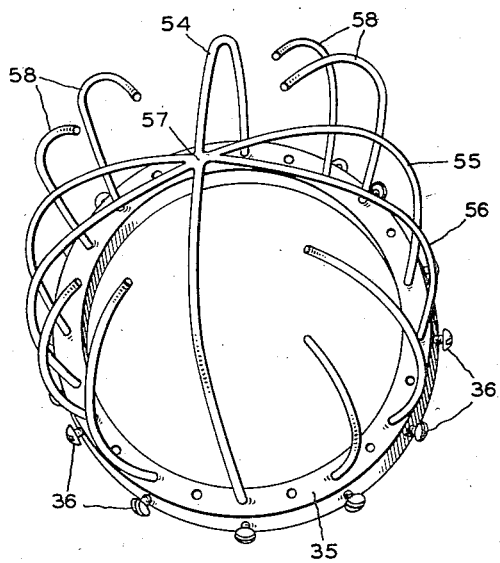
Fig. 3 is an enlarged perspective view of a rotary filling head for use with the embodiment of Fig. 1 for Fancy and Standard cuts of grated coconut.
Figure 4:
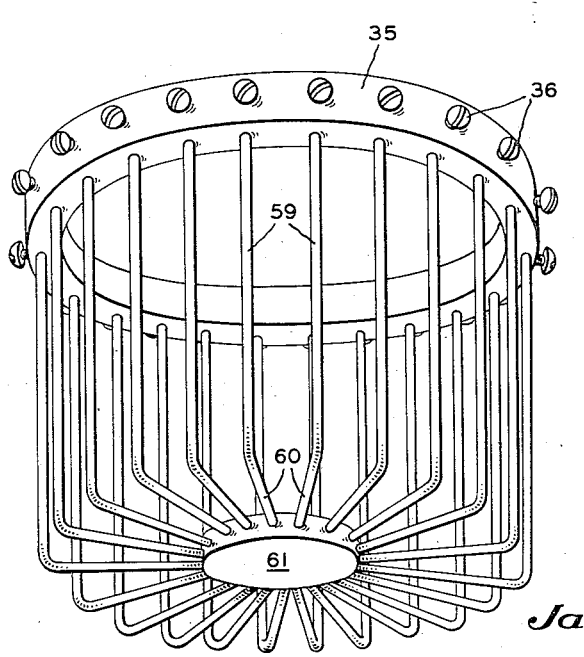
Fig. 4 is a view of a rotary head for use with the embodiment of Fig. 1 for Macaroon cut of grated coconut.

Referring now to Fig. 3, a suitable rotary filling head for a device in acordance with the present invention is there shown to feed Fancy and Standard cuts of coconut. Fig. 4 illustrates a suitable rotary filling head for feeding Macaroon cuts of shredded coconut. As noted above, the Fancy and Standard cuts are the coarser cuts of coconut while Macaroon is a finer cut, almost a coarse powder.

For the coarser cuts of coconut a more open rotary filling head is required, rotated at higher speeds to break up lumps of the coconut and to pass the shreds of coconut through the basket by centrifugal force. The rotary head of Fig. 3 is provided with three substantially semicircular wire-like members 54, 55 and 56, mounted in ring base 35, which join at 57 in the rotary axis of the filling head to prevent the grated coconut from falling through the head. Eight curved wires 58 are spaced in ring base 35 and extend inwardly toward point 57 terminating short thereof and forming with wires 54, 55 and 56 a basket-like member having a partially open bottom. This rotary filling head should be rotated at approximately 700 R. P. M. to provide the desired even continuous flow of Fancy and Standard cuts of grated coconut and to insure breaking up of all lumps and knots of coconut.

The rotary filling head of Fig. 4 is designed for lower speed rotation in the neighborhood of 165 R. P. M. to provide an even and uniform flow of Macaroon cut coconut. Since Macaroon cut coconut is almost a coarse powder a more complete and less open basket is required to prevent the coconut from falling through the filling head. Such a basket is provided by twenty-four wire-like members 59 which are equally spaced about the circumference of ring base 35 and are mounted therein. Wires 59 extend parallel to the rotary axis of the filling head and turn inwardly at 60 at substantially right angles and are received in a suitable solid bottom piece 61 rotating in the axis of rotation of the head.

When grated coconut is to be weighed and packaged the grated coconut either from the coconut grating machine or from a source of supply feeds from pipe 32 to the rotating filling head mounted on ring base 35. The rotating filling head is rotated at the desired speed by shifting belt 27 to the suitable one of the pulleys 28, 29 or 30. If Standard or Fancy cut coconut is to be packaged the filling head of Fig. 3 is employed and rotated at approximately 700 R. P. M. The coconut in pipe 32 enters the rotating filling head formed by ring base 35, wires 54, 55 and 56 and partial wires 58 and lumps or knots of the coconut are there broken up by centrifugal force and the pieces of coconut are spun outwardly from the rotating filling head so that individual pieces of the coconut fall downwardly through hopper 37, and free of lumps and knots pass through cut-off gate 40 into weigh basket 49 where a predetermined amount of the coconut is weighed and then automatically dispensed to package 53.

When Macaroon cut is to be weighed and packaged hopper 37 is removed by loosening brackets 38 and the rotary filling head of Fig. 4 is substituted for the head shown in Figs. 1, 2 and 3. Belt 27 is then shifted to the appropriate pulley 28, 29 or 30 to rotate the filling head at approximately 165 R. P. M. Hopper 37 is replaced and the filling device is ready for use.

It should now be apparent that the present invention in every way satisfies the several objectives described above.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In a rotary coconut filling device, means for conveying grated coconut, rotary means receiving grated coconut from said conveying means, said rotary means including a rotary head defined by spaced wire-like members receiving coconut therein for distribution outwardly between said wire-like members, means for rotating said rotary head, and a hopper surrounding said head.

2. In a rotary coconut filling device, a substantially vertically disposed pipe for conveying grated coconut, rotary means at the lower end of said pipe, means for rotating said rotary means, a rotary head carried by said rotary means receiving coconut therein from said pipe, said rotary head being defined by spaced wire-like members, and a hopper surrounding said head.

3. In a rotary coconut filling device, a pipe disposed to feed grated coconut by gravity, rotary means at the lower end of said pipe, means for rotating said rotary means, a ring base secured to the lower end of said rotary means, a rotary head carried by said base receiving coconut therein from said pipe, said head being defined by spaced wire-like members, and a hopper spaced from and surrounding said head.

4. In a rotary coconut filling device, a pipe disposed to feed grated coconut by gravity, rotary means surrounding the lower end of said pipe, means for rotating said rotary means, a ring base secured to the lower end of said rotary means, a rotary head carried by said base receiving coconut therein from said pipe, said head being defined by spaced wire-like members forming a basket having a partially open bottom, and a hopper spaced from and surrounding said head.

5. A device as described in claim 4 in which said wire-like members are equally spaced around said ring base and extend parallel to the axis of rotation of said head and are curved to bring their lower ends in toward the axis of rotation of said head.

6. A device as described in claim 4 in which said wire-like members are equally spaced around said ring base and extend parallel to the axis of rotation of said head and are curved to bring their lower ends in toward the axis of rotation of said head, some of said wire-like members being joined together in the axis of rotation of said head and others terminating short of this axis.

7. A device as described in claim 4 in which said wire-like members are equally spaced around said ring base and extend parallel to the axis of rotation of said head and are turned in adjacent their lower ends at substantially right angles and meet in the axis of rotation of said head.

8. A device as described in claim 7 in which the inturned ends of said wire-like members connect to a bottom piece rotating in the axis of rotation of said head.

9. In a rotary coconut filling device, a pair of spaced substantially horizontal plates, a pipe disposed to feed grated coconut by gravity passing through said plates, a hollow cylindrical rotary pulley surrounding said pipe and extending through said plates, bearing means mounted on each of said plates and engaging and preventing vertical movement of said pulley, means for rotating said pulley, a base ring removably mounted on said pulley and surrounding the lower end of said pipe, and an open basket-like head carried by said base and receiving coconut from said pipe.

10. A device as described in claim 9 in which said head is defined by a plurality of wire-like members equally spaced about said base ring and extending parallel to the axis of rotation of said head.

11. Means for feeding grated coconut to package filling apparatus comprising a spout of upwardly flaring shape from the lower end of which the coconut is discharged to said apparatus, a feed conduit, and a rotary basket-like head formed of spaced wire-like members mounted to rotate in said spout, said conduit delivering the coconut into said basket-like head for discharge between said wire-like members into said spout.

12. In a coconut filling device, a filling head defined by spaced wire-like members having a plurality of openings therebetween, means for rotating said head about a vertical axis, conduit means for introducing grated coconut into the inside of the rotating filling head whereby the grated coconut passes between said wire-like members and through said openings, and a hopper surrounding said filling head, the walls of said hopper being displaced from said filling head whereby grated coconut passing through the said filling head is collected within said hopper and passes downwardly therein toward an opening in the said hopper.

References Cited in the file of this patent

UNITED STATES PATENTS

| | | |
|---|---|---|
| 872,729 | Hiller | Dec. 3, 1907 |
| 1,171,054 | Keppeler | Feb. 8, 1916 |
| 2,159,670 | Neitzke | May 23, 1939 |
| 2,548,812 | Patterson | Apr. 10, 1951 |